United States Patent [19]
Lussier

[11] Patent Number: 5,496,013
[45] Date of Patent: Mar. 5, 1996

[54] DEVICE FOR MOVING LARGE AND HEAVY LOADS

[75] Inventor: Michel Lussier, Longueuil, Canada

[73] Assignee: Les Systems M.L.G. Inc., Longueuil, Canada

[21] Appl. No.: 256,074
[22] PCT Filed: Dec. 23, 1993
[86] PCT No.: PCT/CA93/00090
  § 371 Date: Jun. 23, 1994
  § 102(e) Date: Jun. 23, 1994
[87] PCT Pub. No.: WO93/16951
  PCT Pub. Date: Sep. 2, 1993

[30] Foreign Application Priority Data

Feb. 26, 1992 [CA] Canada .................................. 2061864

[51] Int. Cl.⁶ ...................................................... B66F 1/00
[52] U.S. Cl. .............................................................. 254/105
[58] Field of Search ......................... 254/105–111, 93 R

[56] References Cited

U.S. PATENT DOCUMENTS 3,659,823  5/1972  Griffin ..................................... 254/105
4,768,835  9/1988  Kalantarov et al. ..................... 254/105

Primary Examiner—Robert C. Watson
Attorney, Agent, or Firm—Edwin E. Greigg; Ronald E. Greigg

[57] ABSTRACT

A device for moving large and heavy apparatuses combining modular rail sections positioned one after the other to form two parallel rails onto which slides a load-carrying plate extending transversely between the rails. The upper surface of the rail section has a central row of upwardly projecting supporting elements positioned at regular intervals along its length. The undersurface of the carrying plate has two opposite edge portions each having two parallel rows of guiding elements projecting down and positioned at regular intervals along its length. When the plate is positioned on top of the rails, the two rows of guiding elements define a guiding channel which may releasably engage the central row of supporting elements projecting up from the corresponding rail. The upper layer of each supporting element and the bottom layer of each guiding element are made of a friction material, either low friction material to facilitate movement therealong or high friction material to enhance friction. Also, the central row of supporting elements of the rails is sized to act as retaining means for a hydraulic jack to push the carrying plate.

19 Claims, 4 Drawing Sheets

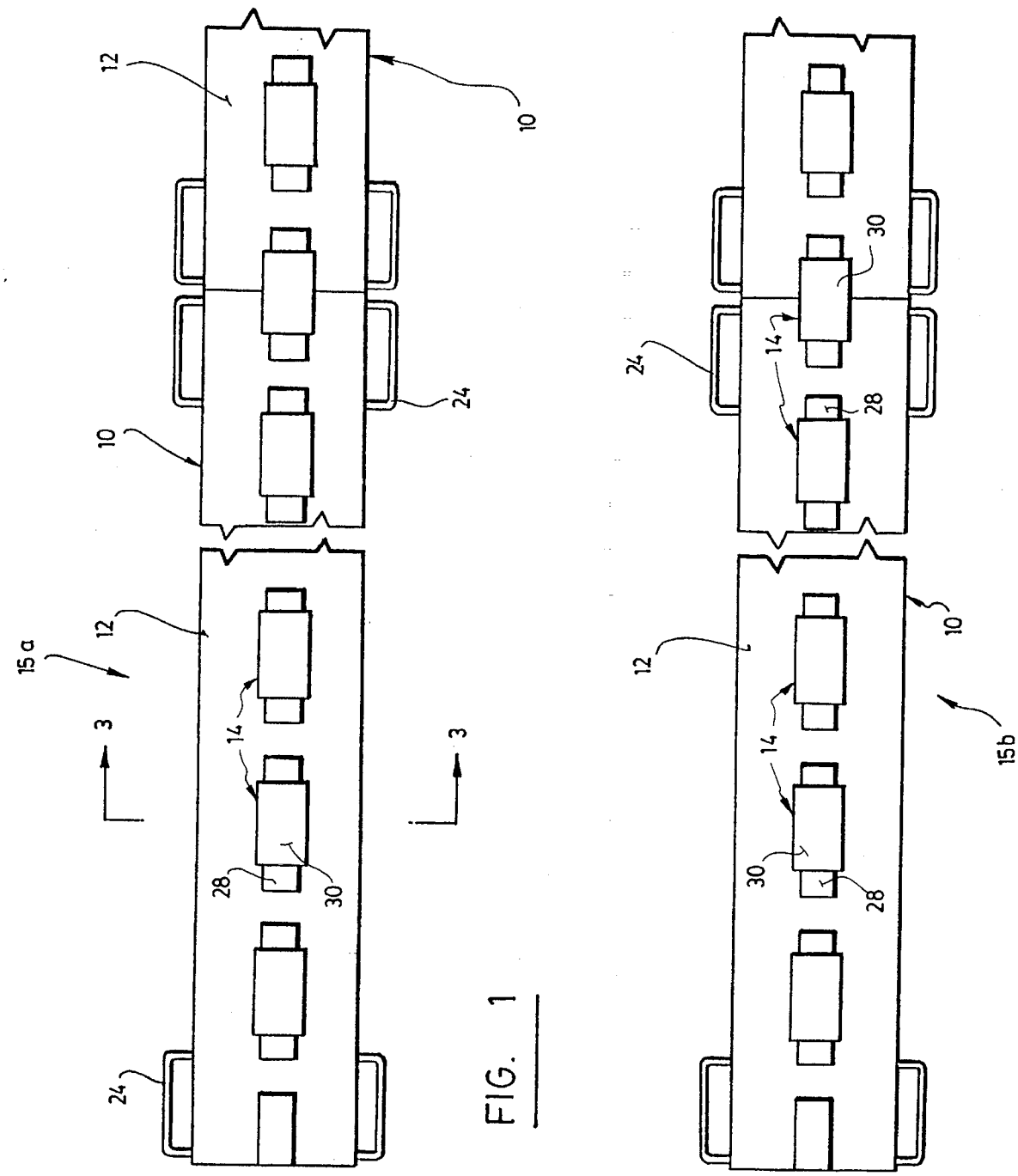

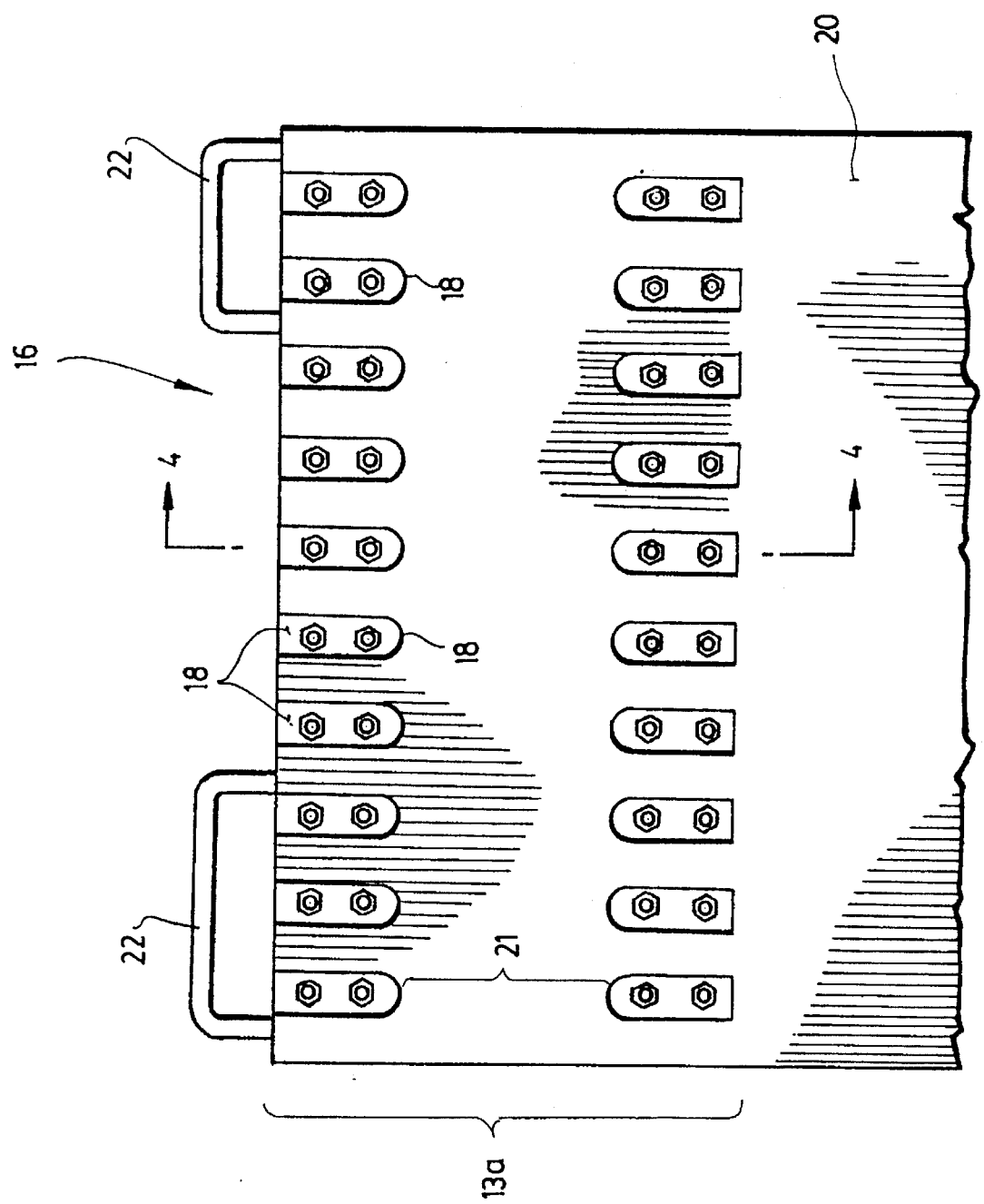

5,496,013

DEVICE FOR MOVING LARGE AND HEAVY LOADS

BACKGROUND OF THE INVENTION

The present invention relates to a device for carrying and moving loads that are heavy and large. More particularly, the invention relates to a combination of two rails and a sliding plate that is movable along these rails by the action of a hydraulic jack.

Objects that weight several hundred tons such as transformers, machines and the like may be extremely large and bulky to transport. Since these devices must be moved with precision to place them where they must be installed, proper control over the movement of such devices is time consuming and requires complex devices with high demands in energy because the friction for moving such objects is great.

U.S. Pat. No. 4,923,174 discloses a device for use to move large and heavy objects. This device includes a pair of parallel rails provided with anchoring structures all over their length. A load-supporting shoe and an actuator supporting shoe connected to each other by a power jack actuator are slidably mounted on each rail. Extension or retraction of the power jack actuator when the actuator-supporting shoes are hold by the anchoring structures in a stationary position causes the load-supporting shoes and the load carried by the same to be moved forwards or rearwards over a given distance along the rails. Of course, such a movement can be repeated after the actuator-supporting shoes are anchored again in another stationary position.

The device disclosed in this patent is quite efficient. However, it is bulky and it does not provide any means for reducing and/or adjusting the degree of friction which may be very high, between the rails and the, load-supporting shoes.

It is therefore one object of this invention to provide an improved device which can be used to move large and heavy loads while installing or relocating the same.

It is another object of this invention to provide a device for moving large and heavy loads, which device is made of modular elements that are easy to carry from one location to the next.

It is a further object of this invention to provide a device for moving large and heavy loads where the degree of friction between the rails and the carrying plate can be changed at will.

It is a further object of this invention to provide a device for moving large and heavy loads where the surface contact of the rail and the plates that slide against each other can be made of high friction or low friction material in the form of interchangeable pads.

SUMMARY OF THE INVENTION

The above-mentioned objects are attained with a device for carrying heavy loads, the device comprising in combination:

modular rail sections that can be assembled to form a pair of parallel rails of a given length;

a load-carrying plate sized to extend transversally between the rails, the plate being movable along the rails; and at least one hydraulic jack for incrementally pushing the heavy load positioned on top of the plate along the rails;

This device is characterized in that:

each of the rail sections comprises an upper surface from which upwardly projects a row of supporting elements extending centrally at regular intervals along the length of the rail sections, each of the supporting elements comprising an upper layer made of a friction material;

the load-carrying plate has an undersurface with two opposite edge portions overlying the rails, each of the edge portions comprising two parallel rows of guiding elements projecting down from the undersurface, the guiding elements being positioned at regular intervals and each comprising a bottom layer made of a friction material, the rows of guiding elements being positioned and sized to define therebetween a guiding channel in which may releasably engage the central row of supporting elements projecting up the corresponding rails; and the supporting elements and guiding elements are of the same height and cooperate for guiding the load-carrying plate along the rails;

whereby, upon engagement of the load-carrying plate on the rails, the bottom layers of the guiding elements bear on the upper surface of the rail sections on both sides of the rows of supporting elements and the upper layers of the supporting elements bear on the undersurface of the plate in the guiding channels, thereby facilitating sliding of the plate and load on the rails.

IN THE DRAWINGS

FIG. 1 is a partial top plan view of the modular rail sections of a device according to the invention when assembled to form two parallel rails;

FIG. 2 is a bottom plan view of a portion of the load-carrying plate of a device according to the invention;

DETAILED DESCRIPTION OF ONE EXAMPLE OF A PREFERRED EMBODIMENT

Figure 4:
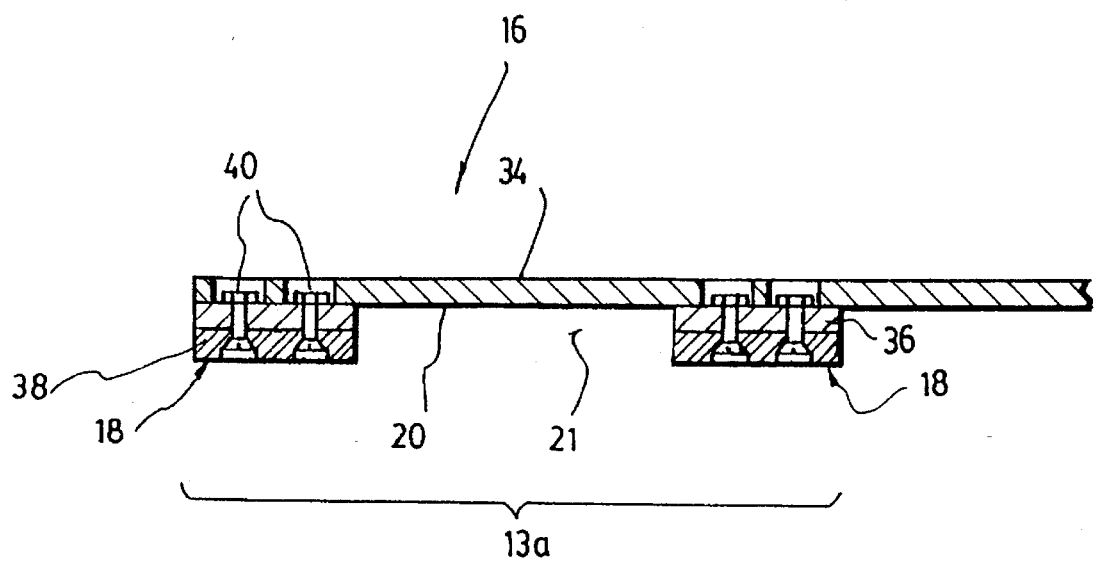
FIG. 4 is a cross section view of the plate of FIG. 2 as cut along line 4—4 shown with the guide elements extending downwardly from the undersurface.

FIG. 1 shows a partial assembly of modular rail sections 10, having a length much larger than its width, and a width much larger than its thickness. These sections 10 can be assembled one end adjacent to another section's end to form a rail of variable length depending on the number of sections positioned one after the other. These modular sections 10 are adapted to be positioned on top of conventional rails or to be assembled on top of a series of transversal dormants. These modular sections 10 when assembled one after the other are to be positioned in two parallel longitudinal rails 15a and 15b. These sections 10 have an upper surface 12 from which upwardly projects a row, preferably a central row, of supporting elements 14 positioned at regular intervals along the length of the rail. Each supporting element comprises a middle layer 28, and an upper layer 30.

FIG. 2 shows a portion of a load carrying plate 16 that is sized to extend transversally between the rails 15a and 15b. The plate 16 has an undersurface 20 having two opposite edge portions with only edge positions 13a shown overlying the parallel rails, respectively. The plate 16 is movable along these rails and each opposite edge portion 13a (or 13b) is guided therealong by two parallel rows of guiding elements 18 that project down from the undersurface 20, each guiding element 18 being positioned at regular intervals. The guiding elements 18 are positioned and sized so as to define in between them a guiding channel 21.

Both the rail sections 10 and the load carrying plate 16 comprise handles 24 and 22 respectively for helping users to add or remove them from this assembly.

Figure 3:
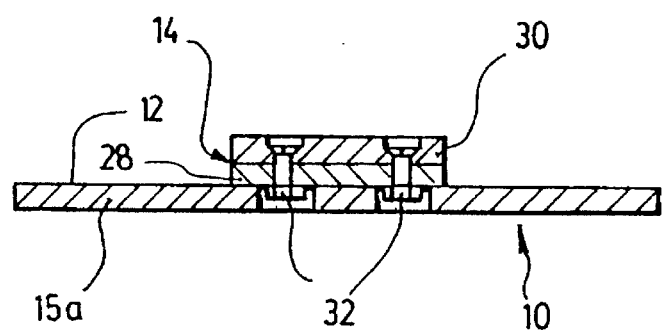
FIG. 3 is a cross section view of one rail section of FIG. 1 as cut along line 3—3.

As shown in FIG. 3, the supporting elements 14 of the modular rail section 10 comprise the middle layer 28 and the upper layer 30 that projects upwardly from the upper surface 12 of the section 10. The middle layer 28 and upper layer 30 are in the form of pads, and the upper pad 30 is made of a friction material, which is preferably a low friction material such as very high molecular weight plastic, even though a high friction material such as steel could be used. These pads 28 and 30 are secured with screws 32 that may be untightened to separate the pads 30 from the middle layer 28 to allow user to replace the upper layer 30 after it is worn or to change for another friction material.

FIG. 4 shows the load carrying plate 16 with its rows of guiding elements 18 projecting downwardly from the undersurface 20, the space between each row defining the guiding channel 21. The two rows of supporting elements 14 releasably engage in the guiding channel 21 when the plate 16 is positioned on top of the rail 15a. The guiding elements 18 comprise a middle layer 36 of steel, and a bottom layer 38 that is made out of a friction material, preferably a low friction material such as very high molecular weight plastic even though a high friction material such as steel could be used. The middle layer 36 and bottom layer 38 are in the form of pads secured to the body 34 of the plate by screws 40 that may be untightened to separate the pads 36 and 38 and allow a user to replace the bottom layer 38 after it is worn or to change the friction material.

As may also be seen from FIGS. 3 and 4, once the carrying plate 16 is positioned on top of the rail 15a, the only surfaces that will come in contact with each other are the undersurface 20 of the carrying plate 16 with the upper layer 30 of the supporting elements 14 of the rail 15a, and the upper surface 12 of the rail 15a with the bottom layer 38 of the guiding elements 18 of the carrying plate 16.

Of course, to attain this, the supporting elements 14 must be of the same height as the guiding elements 18. Also, it is to be understood that the supporting elements 14 may be positioned in two parallel rows, whereas the guiding elements 18 may be positioned in one central row to attain the same effect.

This system allows a user to reduce the friction during the sliding of the carrying plate 16 since no two steel surfaces touch each other. Moreover, since the upper layer 30 and bottom layer 38 are easily replaceable, it does not constitute a problem if the high molecular weight plastic wears out since these modular supporting elements 14 and guiding elements 18 may easily be replaced.

Again, this system permits the removal of low friction material and replacement by upper and bottom pads made out of steel (a higher friction material) allowing the user to control the friction of the two surfaces sliding against each other.

Figure 5:
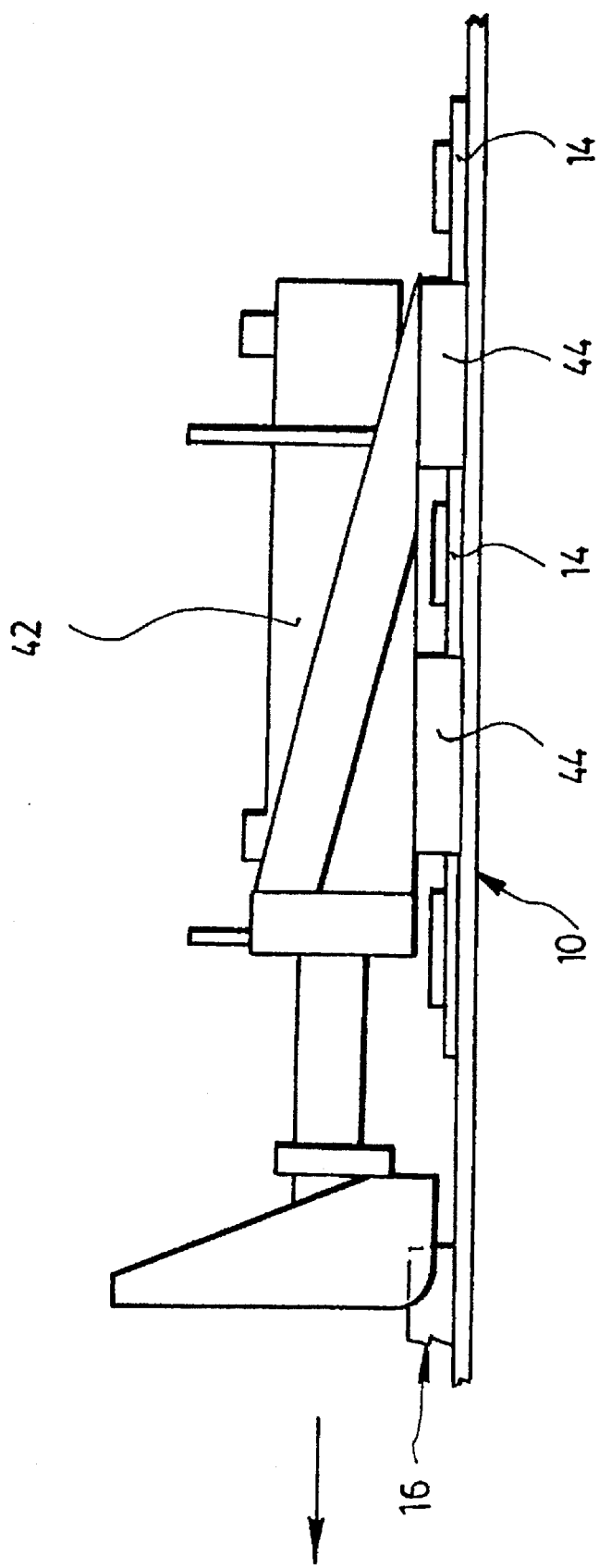
FIG. 5 is an elevational view of the device of the invention, when a hydraulic jack is retained between the supporting elements of the rail sections according to the invention.

Finally, as shown in FIG. 5, this system is made in such a fashion so that the supporting elements 14 of the rail sections may serve as retaining means for one of more hydraulic jacks 42 that incrementally pushes the heavy load.

Each jack 42 comprises a plurality of feet 44 sized so that they may be positioned snugly between two abutting elements 14 and therefore secure the hydraulic jack 42 in fixed position when it is used to push the load.

I claim:

1. A device upon which a heavy load is moved by at least one hydraulic jack, said device comprising, in combination:

modular rail sections (10) that can be assembled to form a pair of parallel rails (15a, 15b) of a given length;

a load-carrying plate (16) sized to extend transversely between said rails (15a, 15b), said plate being movable along said rails; and at least one hydraulic jack (42) for incrementally pushing said heavy load positioned on top of said plate (16) along said rails (15a, 15b);

characterized in that:

each of said rail sections (10) comprises an upper surface (12) from which a row of supporting elements (14) extending centrally at regular intervals along the length of said rail sections project upwardly, each of said supporting elements (14) comprising an upper layer (30) made of a friction material;

the load-carrying plate (16) has an undersurface (20) with two opposite edge portions (13a, 13b) overlying said rails, each of said edge portions comprising two parallel rows of guiding elements (18) projecting down from the undersurface (20), said guiding elements (18) being positioned at regular intervals and each comprising a bottom layer (38) made of a friction material, said rows of guiding elements (18) being positioned and sized to define therebetween a guiding channel (21) which may releasably engage said central row of supporting elements (14) projecting up from the corresponding rails (15a, 15b); and said supporting elements (14) and guiding elements (18) are of the same height and cooperate for guiding said load-carrying plate (16) along said rails (15a, 15b);

whereby, upon engagement of said load-carrying plate (16) on said rails (15a, 15b), the bottom layers (38) of said guiding elements (18) bear on said upper surface (12) of said rail sections (10) on both sides of said rows of supporting elements (14) and the upper layers (30) of said supporting elements (14) bear on the undersurface of said plate (16) in said guiding channels (21), thereby facilitating sliding of said plate (16) and load on said rails (15a, 15b).

2. A device according to claim 1, wherein said supporting elements (14) are positioned and sized to act as retaining means for said at least one hydraulic jack (42).

3. A device according to claim 1, wherein the upper layers (30) of said supporting elements (14) and the bottom layers (38) of said guiding elements (18) are in a form of interchangeable pads detachably fixed to said supporting elements and said guiding elements (18).

4. A device according to claim 3, wherein said interchangeable pads (30, 38) are made of a low friction material to reduce friction between said rail and said load carrying plate.

5. A device according to claim 4, wherein said low friction material is made of very high molecular weight plastic.

6. A device according to claim 3, wherein said interchangeable pads (30, 38) are made of a high friction material to enhance and control friction between said rails (15a, 15b) and said load carrying plate. (16).

7. A device according to claim 2, wherein the upper layers (30) of said supporting elements (14) and the bottom layers

(38) of said guiding elements (18) are in a form of interchangeable pads detachably fixed to said supporting elements (14), and said guiding elements (18).

8. A device according to claim 7, wherein said interchangeable pads (30, 38) are made of a low friction material to reduce friction between said rail and said load carrying plate.

9. A device according to claim 7, wherein said interchangeable pads (30, 38) are made of a high friction material to enhance and control friction between said rails (15a, 15b) and said load carrying plate (16).

10. A device upon which a heavy load is moved, said device comprising, in combination:

a load-carrying plate (16) sized to extend transversely between a pair of parallel rails (15a, 15b)) of a given length, said plate being movable along said rails;

characterized in that:

each of said rail sections (10) comprises an upper surface (12) from which a row of supporting elements (14) extending centrally at regular intervals along the length of said rail sections project upwardly, each of said supporting elements (14) comprising an upper layer (30) made of a friction material;

the load-carrying plate (16) has an undersurface (20) with two opposite edge portions (13a, 13b) overlying said rails, each of said edge portions comprising two parallel rows of guiding elements (18) projecting down from the undersurface (20), said guiding elements (18) being positioned at regular intervals and each comprising a bottom layer (38) made of a friction material, said rows of guiding elements (18) being positioned and sized to define therebetween a guiding channel (21) which may releasably engage said central row of supporting elements (14) projecting up from the corresponding rails (15a, 15b); and said supporting elements (14) and guiding elements (18) are of the same height and cooperate for guiding said load-carrying plate (16) along said rails (15a, 15b);

whereby, upon engagement of said load-carrying plate (16) on said rails (15a, 15b), the bottom layers (38) of said guiding elements (18) bear on said upper surface (12) of said rail sections 910) on both sides of said rows of supporting elements (14) and the upper layers (30) of said supporting elements (14) bear on the undersurface of said plate (16) in said guiding channels (21), thereby facilitating sliding of said plate (16) and load on said rails (15a, 15b).

11. A device according to claim 10, wherein said supporting elements (14) are positioned and sized to act as retaining means for said at least one hydraulic jack (42).

12. A device according to claim 10, wherein the upper layers (30) of said supporting elements (14) and the bottom layers (38) of said guiding elements (18) are in a form of interchangeable pads detachably fixed to said supporting elements (14) and said guiding elements (18).

13. A device according to claim 11, wherein the upper layers (30) of said supporting elements (14) and the bottom layers (38) of said guiding elements (18) are in a form of interchangeable pads detachably fixed to said supporting elements (14) and said guiding elements (18).

14. A device according to claim 12, wherein said interchangeable pads (30, 38) are made of a low friction material to reduce friction between said rail and said load carrying plate.

15. A device according to claim 13, wherein said interchangeable pads (30, 38) are made of a low friction material to reduce friction between said rail and said load carrying plate.

16. A device according to claim 14, wherein said low friction material is made of very high molecular weight plastic.

17. A device according to claim 15, wherein said low friction material is made of very high molecular weight plastic.

18. A device according to claim 12, wherein said interchangeable pads (30, 38) are made of a high friction material to enhance and control friction between said rails (15a, 15b) and said load carrying plate (16).

19. A device according to claim 13, wherein said interchangeable pads (30, 38) are made of a high friction material to enhance and control friction between said rails (15a, 15b) and said load carrying plate (16).

* * * * *

UNITED STATES PATENT AND TRADEMARK OFFICE
CERTIFICATE OF CORRECTION

PATENT NO.   : 5,496,013
DATED        : March 5, 1996
INVENTOR(S)  : Michel Lussier It is certified that error appears in the above-identified patent and that said Letters Patent is hereby corrected as shown below: Title page:

Item:[22] to read:

[22]  PCT Filed:     Feb. 23, 1993

Signed and Sealed this

Sixteenth Day of July, 1996

Attest:

BRUCE LEHMAN

Attesting Officer    Commissioner of Patents and Trademarks